UNITED STATES PATENT OFFICE.

ALADÁR von LÁSZLOFFY, OF PEORIA, ILLINOIS.

MANUFACTURE OF BY-PRODUCTS FROM DISTILLERY-SLOP.

1,147,769.  Specification of Letters Patent.  Patented July 27, 1915.

No Drawing. Original application filed January 30, 1911, Serial No. 605,611. Divided and this application filed February 26, 1912. Serial No. 679,990.

*To all whom it may concern:*

Be it known that I, ALADÁR VON LÁSZLOFFY, citizen of the United States, residing at Peoria, in the county of Peoria and State of Illinois, have invented certain new and useful Improvements in Manufacture of By-Products from Distillery-Slop; and I do hereby declare that the following is a full, clear, and exact description of the invention, which will enable others skilled in the art to which it appertains to make and use the same.

This invention relates to a process of recovering by-products from distillery-slop. The object of the invention is to provide a process of recovering from distillery-slop a plurality of valuable products by first extracting from the slop a mixture containing the by-products in a concentrated state, and afterward separating the several by-products contained in this mixture from one another.

The present application is divided from my pending application for the manufacture of by-products from distillery slop Serial Number 605,611, filed January 30, 1911, in which has been described the manner of extracting from distillery slop a mixture in which is contained lactic acid, succinic acid and glycerin, and also fat, if the slop contains it, by treating the concentrated slop with ethyl-alcohol, methyl alcohol, higher alcohols, or mixtures of the same with ethyl ether, fusel oil, chloroform, tetrachlorid of carbon, or other mixtures in which alcohol predominates.

While the just mentioned process embraces the methods of obtaining the mixture of by-products, the present process represents one of the methods of singling out the individual components of this mixture.

The following, which is the preferred mode of practising the present invention, explains the manner of procedure. The distillery slop having been concentrated preferably to a syrupy consistency as described in the application above referred to and treated with an alcoholic solvent gives an insoluble residue containing the albuminous gummy and other substances of the slop, and a solution containing the lactic acid, succinic acid, glycerin and fat in a concentrated state. The solution is concentrated by evaporating the solvent, and this mixture, hereinafter referred to as the "mixture of by-products," is further separated into components. The singling out of the fat, lactic acid, succinic acid, and glycerin is accomplished in the present process by the use of solvents which can only dissolve certain of the substances. That is to say, the substances contained in the mixture are each acted on according to its degree of solubility in the solvent used. The action on the mixture of by-products is brought about by thoroughly mixing the solvent with the same in any suitable receptacle. The fat may be eliminated at the beginning of the treatment since it is insoluble in the other substances present in the mixture and can, therefore, be easily separated from the same by reason of its difference in specific gravity. For instance, it may be allowed to rise to and accumulate upon the surface of the mixture and may then be skimmed off, or, it may be removed in any later stage of the process if desired. The next step is the separation of the organic acids from the remaining mixture of other by-products. This separation is effected by treating the mixture of by-products with ethyl-ether, for example, as the solvent. This solvent dissolves the lactic and succinic acids and but very little of the glycerin, which latter remains in the residue. The ethyl-ether does not easily penetrate and act on the mixture of by-products since the character and behavior of the latter toward it is dominated by the glycerin, water and impurities which are almost insoluble in ether. Since the mixture of by-products and the ether do not easily mix, but rather repel each other, I may bring about a more intimate contact between them by agitation, or the mixture of by-products and solvent may be spread over a large surface, as for example, upon and through an absorbent material for instance gypsum. But other methods may be resorted to, to bring about the dissolving action of the ether on the mixture of by-products in such a way that the ether can reach finely divided portions of the said mixture.

The solution resulting from the treatment of the mixture of by-products with ether contains the lactic and succinic acids and fat, if that substance has not already been eliminated from the mixture before the treatment with ether as before stated. Now, by concentrating the solution as, for instance, by the process of evaporation the solvent is recovered and if the fatty substances have not been before eliminated they may now be skimmed off as they become insoluble. The solution now remaining contains the lactic and succinic acids of a high grade of purity. I have found that owing to this great purity the succinic acid will crystallize, if the concentrated solution is allowed to stand. The crystals can be easily separated from the solution which contains the lactic acid either by settling, filtering or by the use of a centrifugal machine. I thus utilize the simple crystallizing process for the separation of the lactic and succinic acids from one another.

Having described the treatment of the etheric solution, that of the residue containing the glycerin will now be explained. The purity of the glycerin contained in the residue depends on the character of the slop and the character of the solvent used for obtaining the original mixture of by-products. Any impurities may be eliminated therefrom by any of the known processes, for instance, by treatment with bone-coal, distillation, treatment with lime, sulfuric acid and like methods.

The above described process of singling out lactic acid, succinic acid, glycerin and fat can be used not only in connection with the method mentioned of extracting a mixture of by-products, but, of course, can be used also to separate the components of a mixture of by-products obtained by other processes. Besides the use with ethyl-ether the process can be practised with fusel oil, mixtures of both or such other solvents as are capable of dissolving lactic and succinic acids but which dissolve very little or no glycerin, such solvents of whatever nature being considered equivalents. I have found, however, that ethyl-ether is the most advantageous solvent for carrying out this process and therefore it is used with preference, but I do not confine myself to its use but consider within the scope of my invention the substitution of a solvent of equivalent properties capable of dissolving organic acids as already explained, but that will not form a homogenous mixture with glycerin.

Having described my invention, I claim:—

1. In the process of recovering lactic acid and succinic acid from distillery-slop the steps which consist in treating distillery-slop, from which the albuminous and gummy substances have been eliminated, with a solvent capable of dissolving the organic acids of the slop and capable also of repelling glycerin, separating the solution resulting from this treatment from the insoluble part, concentrating the solution by eliminating the solvent to liberate the fat, and separating the fat from the remaining solution.

2. In the process of recovering lactic and succinic acid from distillery slop from which the gummy and albuminous substances have been eliminated, the steps which consist in treating such a distillery slop with a solvent capable of dissolving the organic acids therein and capable also of repelling glycerin, separating the solution resulting from this treatment from the insoluble part, concentrating the solution by eliminating the solvent, and accomplishing the separation of the lactic acid contained in the solution from the succinic acid by allowing the succinic acid to crystallize.

In testimony whereof I affix my signature, in presence of two witnesses.

ALADÁR von LÁSZLOFFY.

Witnesses:
 EUNICE M. BECKUM,
 L. M. THURLOW.